INVENTOR.
CARL E. WHITE
BY James A. Walsh
ATTORNEY

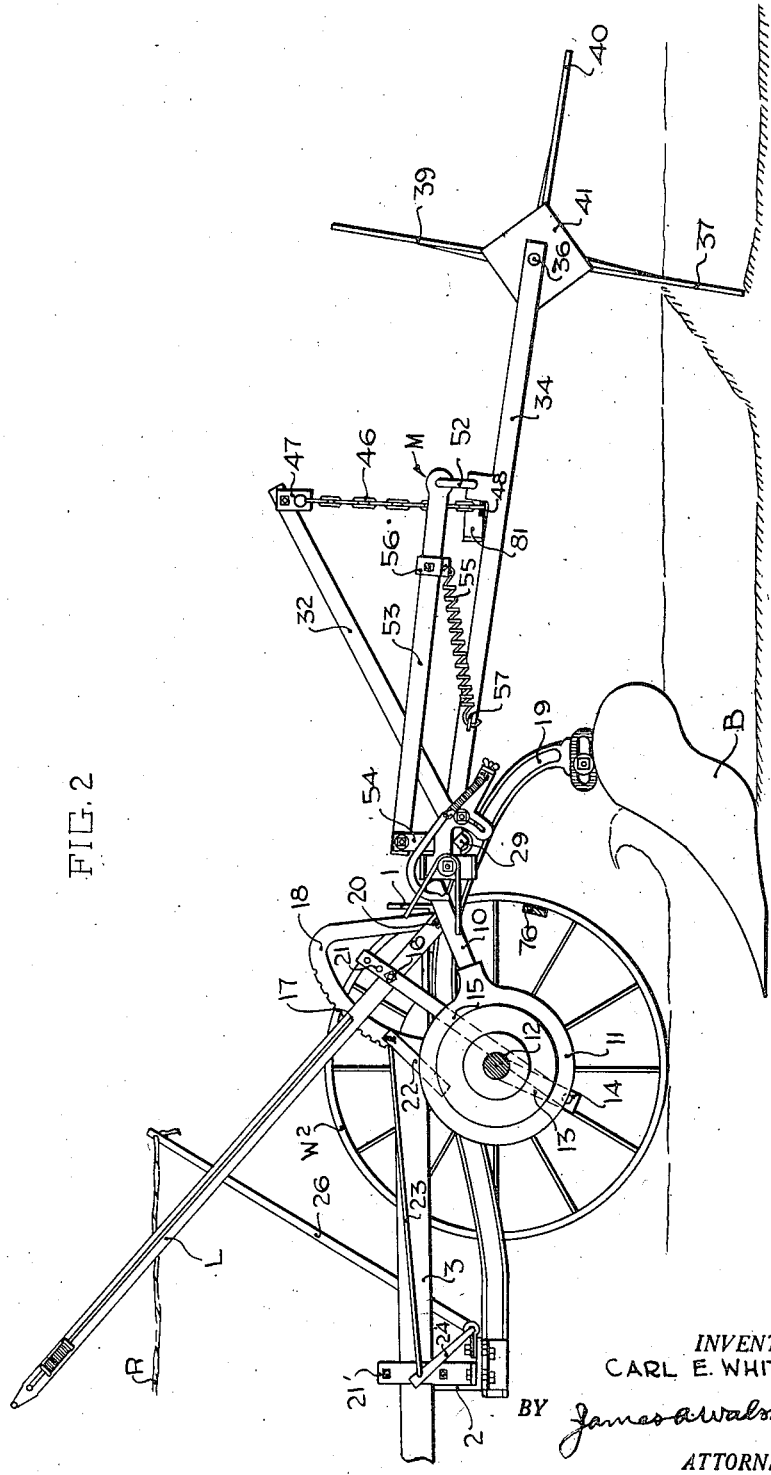

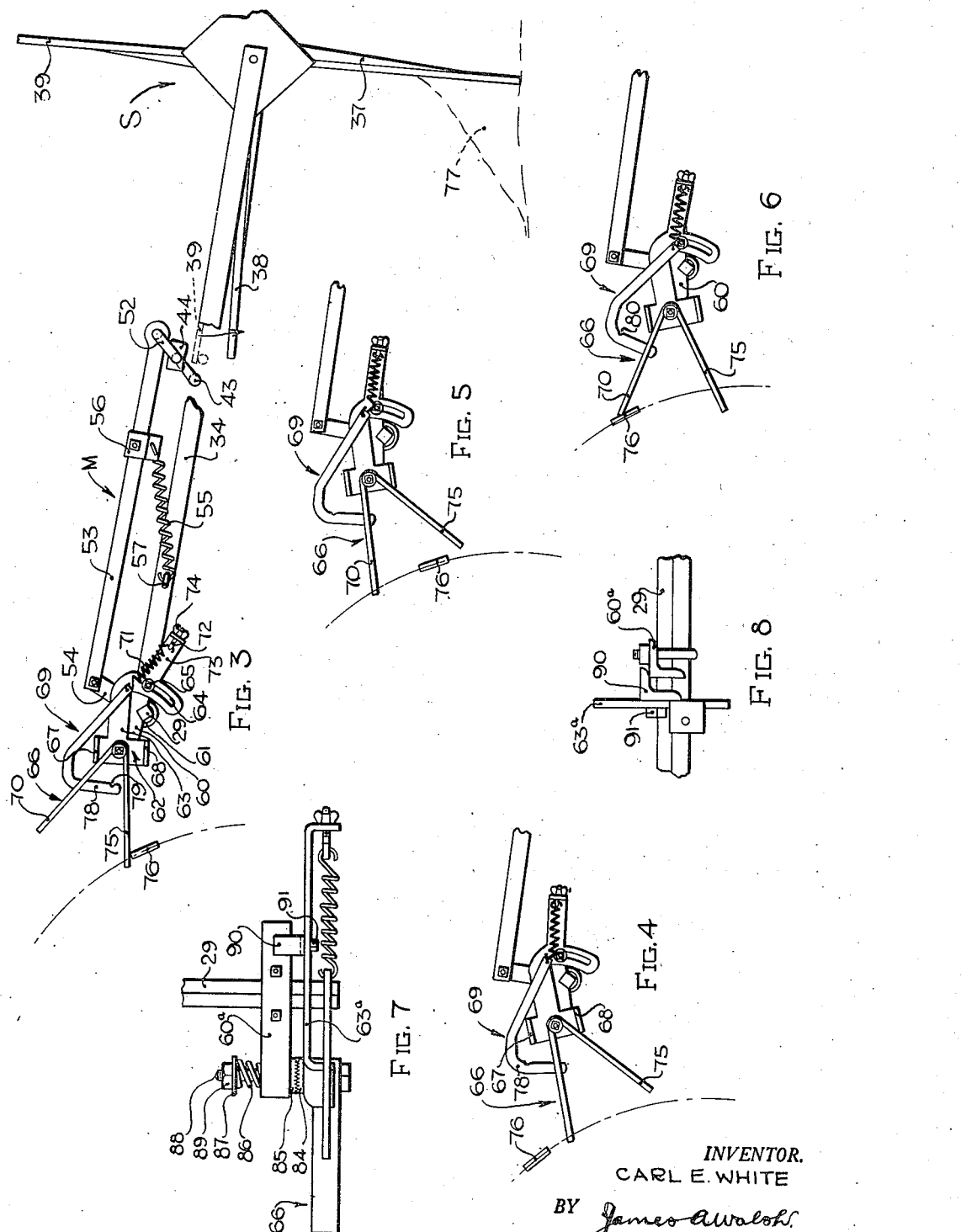

Patented Dec. 26, 1939

2,184,691

UNITED STATES PATENT OFFICE 2,184,691

BASIN FORMING IMPLEMENT

Carl E. White, Rockford, Ill., assignor to J. I. Case Company, Racine, Wis., a corporation Application September 30, 1937, Serial No. 166,470

13 Claims. (Cl. 97—55)

The present invention relates to plows, and particularly to attachments therefor of the type adapted to cause the implement to form a series of basins instead of continuous furrows, whereby the land so treated will catch and absorb rainwater and tend to prevent its running off and forming gullies and carrying away the valuable top soil.

An object of the invention is to generally improve the construction and operation of devices of this class.

A further object is to provide improved mechanism for controlling such devices.

More particularly, an object of the invention is to provide a drag or scraper arranged to be trailed in the furrow behind a plow, and to be tripped at intervals to form dams across the furrow at spaced points, the portions of the furrow between the dams forming the basins; to provide mechanism for tripping the scraper at variously spaced intervals to suit individual conditions; such means actuated by a tappet mounted on a wheel of the plow; mechanism whereby the trip mechanism is actuated only upon every other turn of the wheel; expedients for lifting the scraper when the plow is lifted for transportation; means for preventing damage if the implement is backed, and other expedients looking toward a realization of the above objects.

An illustrative embodiment of the invention is described in the following specification and illustrated in the accompanying drawings, in which:

Fig. 2 is a side view of the machine in section on the line 2—2 of Fig. 1.

Fig. 3 is a left side elevation of certain mechanism indicated in Fig. 1.

Fig. 4 is a similar view of a part of the mechanism of Fig. 3, set up for a different mode of operation, and suggesting one phase in the cycle of operation.

Figs. 5 and 6 are similar views showing other phases of the same cycle.

Fig. 7 is a plan view of a modified form of trip mechanism.

Fig. 8 is a rear elevation of part of the mechanism indicated in Fig. 7.

Similar reference characters have been applied to the same parts throughout the drawings and specification.

Figure 1:
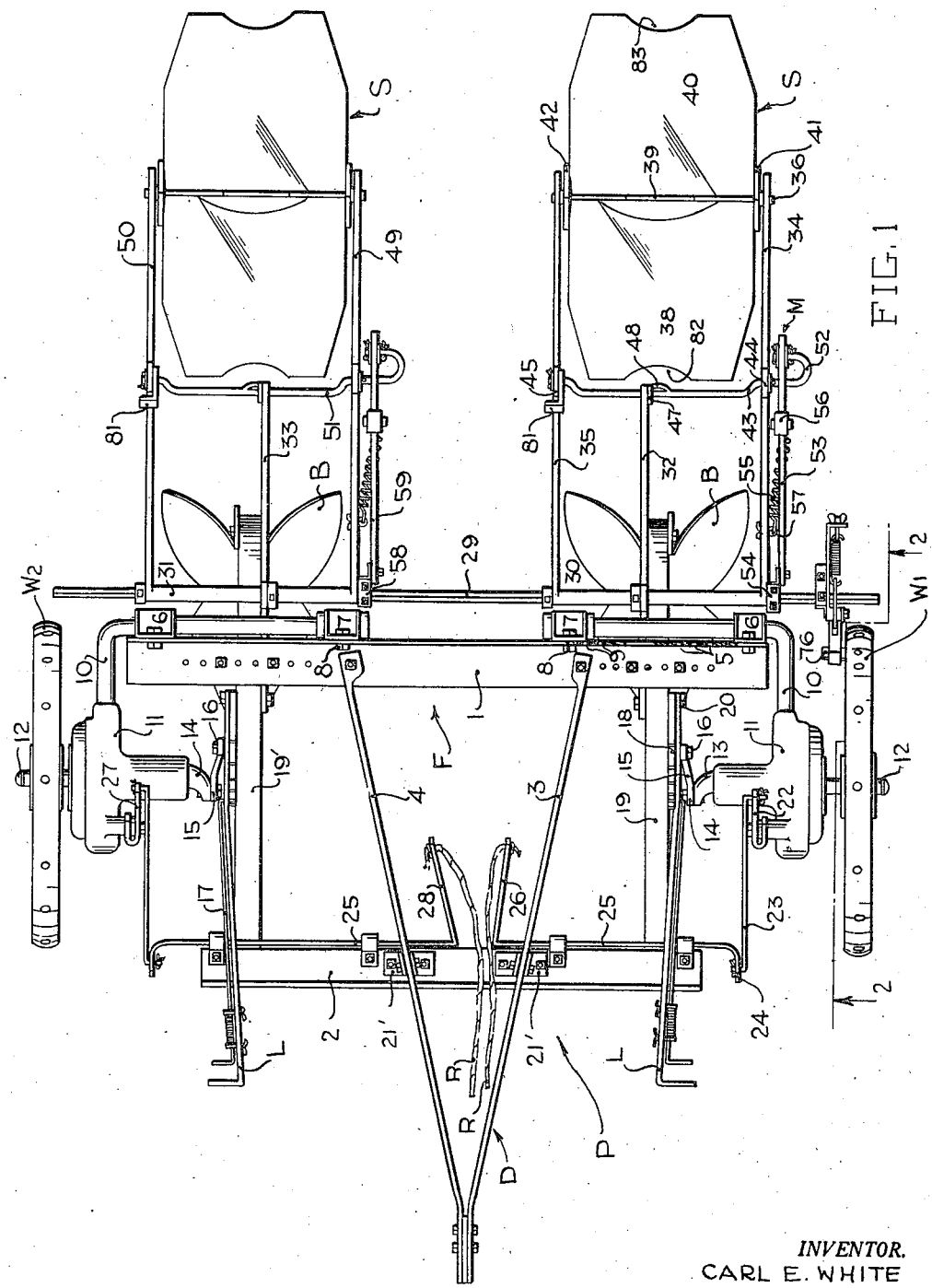
Figure 1 is a plan view of an implement embodying the invention.

As seen in Fig. 1, the implement consists of a two-bottom lister plow, generally designated as P, although it is to be understood that the invention can be embodied in other types of implements, such, for example, as a plow with more or less than two bottoms, and nothing in this specification is to be taken as limiting the invention to the type of implement shown, or in fact in any manner except as defined in the following claims.

The plow has a main frame generally designated as F carried by wheels $W^1$ and $W^2$ and a drawbar portion D for attachment to a tractor (not shown) or other suitable source of draft power. The height of the frame above the ground, and accordingly the depth of plowing, can be regulated by means of adjusting levers L—L, and the frame may be lifted by power from the wheels, all as in a manner described hereinafter, by pulling on trip ropes R—R, for putting the implement into condition for transportation, turning, etc.

Frame F carries plow bottoms B—B, and scrapers or drags generally designated as S—S trail behind the frame in the furrows formed by the plow bottoms. Release mechanism M operates to release the scrapers S at predetermined intervals to permit them to turn in order to liberate a small quantity of soil to form a dam across the furrow. Obviously the mechanisms might be extended or curtailed to form more or less than two furrows within the contemplation of the invention.

As seen in Fig. 1, frame F includes cross members 1 and 2, connected in spaced relation by portions 3 and 4 of drawbar D, and to which the major portions of the plow are attached. The cross members are conveniently made of sections of angle iron, member 1 having holes 5—5 for the attachment of seeding apparatus or the like if desired. Bearing brackets 6 and 7 are fixed with member 1, bracket 6 being permanently mounted thereon, while bracket 7 is adjustable transversely of the machine by removing a bolt 8 and engaging it with other holes as 9. Brackets 6 and 7 carry a crank arm 10, which bends forwardly and is fixed with a power-lift clutch 11 of well known or suitable type having an axle portion 12 to which is fixed above mentioned wheel $W^1$.

Wheel $W^1$ is conveniently made adjustable on axle 12, and adjustment of bracket 7 changes the position of arm 10 in bracket 6, these changes affording a substantial range of adjustment for the wheel so that it may be positioned where desired in relation to previously formed furrows or the like.

Clutch 11 includes an arm 13 which is connected with the wheel when the clutch is engaged, and rotates from a downwardly to an upwardly extending position or vice versa, in well known manner, the arm being pivoted at 14 (Fig. 2), to a link 15, extending upwardly and pivoted at 16 to above mentioned lever L, the lever having a detent 17 adjustable relatively to a quadrant 18 for adjusting the depth of plowing. Quadrant 18 is secured to a plow beam 19 fixed with plow bottom B, and lever L is pivoted to the beam and quadrant at 20. Additional holes 21—21 are provided in link 15 for increasing the range of adjustment of the plowing depth. Beam 19 is fixed with cross member 1 and at its forward end to cross member 2, which is firmly anchored to drawbar members 3 and 4 as by clamps 21' for transmitting the pull of the draft means directly to the beam.

The construction and mechanism above outlined is duplicated on the right side of the machine, and related in the same manner to wheel $W^2$ and a beam 19', fixed in like manner with cross members 1 and 2. Adjustment of either wheel may accordingly be made to level the frame and to obtain the desired depth of plowing. Tripping of either wheel clutch will cause substantial raising or lowering of that side of the frame relatively to the wheel, and these clutches may be used either separately or together, by pulling the appropriate trip ropes, for getting the plows into or out of the ground.

For tripping clutch 11 a lever 22 of well-known type extends therefrom and is connected by a rod 23 with a lever 24 fixed on a shaft 25 suitably journaled on cross member 2 and carrying an upstanding lever 26, to which is attached one of the above mentioned ropes R. This mechanism is also duplicated for wheel $W^2$, and includes a lever 27, connected in like manner with a lever 28. The ropes R—R from the respective levers 26 and 28 extend to within reach of the operator on the tractor, and, by pulling on the appropriate rope, either side of the implement may be raised or lowered by power, as desired. By pulling upon both ropes simultaneously, the machine may be raised or lowered bodily.

The implement described so far is substantially typical of those known as "listers", "middle busters", "lister plows", etc., and the present invention deals particularly with apparatus for forming the dams in the furrows left by the bottoms B—B, although it is to be understood that it is not limited to the attachment except as defined in the annexed claims.

The attachment includes shaft 29, which is conveniently made square or angular in cross-section for a purpose to appear. It is supported in sleeves 30 and 31, Fig. 1, in turn supported in arms 32 and 33, through which they pass, the arms being fixed with any convenient part of the frame F, in the present instance beams 19 and 19'. Fixed to sleeve 30 is a pair of drag-bars 34 and 35, extending rearwardly and engaged with a pivot shaft 36 extending across from one to the other drag-bar, and upon which is mounted for pivotal movement one of the above mentioned scrapers or wheels S.

The scraper, in the present instance, is in the general form of a paddle-wheel, having a plurality of blades 37, 38, 39 and 40, Fig. 2, of a shape determined by the desired cross-section of the completed furrow, and suitably united at their inner edges as by gusset plates 41 and 42, Fig. 1. The paddle-wheel is prevented from rotating by means such as a swingable bail 43 journaled in upstanding ears 44 and 45, carried by bars 34 and 35 respectively, the bail being engaged beneath one of blades 37—40 most of the time, and swung forwardly momentarily when it is desired to permit rotation of the paddle wheel.

Arm 32 extends upwardly and rearwardly to a point substantially over bail 43, and a chain 46, Fig. 2, is engaged between a connector plate 47 pivotally connected to the arm and an ear 48 carried by the bail. Since the drag-bars 34 and 35 are in effect pivoted to the frame by means of sleeve 30, scraper S would not be lifted from the ground when frame F was raised, except that arm 32 rises bodily with frame F, taking up the normal slack in chain 46, which then exerts a lifting force on bail 43 for raising the drag-bars, and lifting scraper S clear of the ground. Plate 47 may engage any desired link of chain 46 so that it will be slack enough to permit free movement of the scraper over the ground, but tight enough to promptly raise the drag-bars upon upward movement of the frame F.

This mechanism may be duplicated at the other side of the machine, including drag-bars 49 and 50, Fig. 1, and a bail 51.

The releasing mechanism for bail 43 includes a crank portion 52 on the bail to which is connected a push-rod 53, pivotally connected at its forward end to an upwardly extending arm 54, fixed with above mentioned square shaft 29. Rearward movement of the push-rod will accordingly cause rotation of the bail 43 in a direction to remove it from beneath blade 38, such motion being caused by clockwise rotation of shaft 29, as seen in the various figures and the parts are returned by a spring 55 engaged between a clamp 56 on rod 53 and a hook or the like 57 on drag-bar 34.

A similar arm 58 and push-rod 59 is provided for bail 51, also receiving its motion from square shaft 29. Trip mechanism arranged to actuate shaft 29 accordingly will release both scrapers, or as many as may be incorporated in a single machine.

The trip mechanism used in the present instance is best shown diagrammatically in Fig. 3, and comprises, fixed with square shaft 29, a bracket 60, clamped in place by a U-bolt 61, or other suitable means to allow shifting of the bracket on the shaft to accommodate various spacings of the wheels. Pivoted to the forward end of the bracket at 62 is a stop plate generally designated as 63, extending rearwardly over shaft 29 and having a downwardly extended portion providing a slot 64. A bolt or the like 65 extends through the slot and is engaged with bracket 60 for clamping the plate in various relations therewith for a purpose to appear. Also pivoted at 62 is a V-shaped trip 66, extending forwardly of bracket 60, and arranged to swing up and down to the extent permitted by upper and lower stops 67 and 68, respectively, on stop plate 63.

During operation for close spacing of the dams trip 66 does not move relatively to bracket 60, but is held substantially in contact with upper stop 67 by means of a detent bar generally designated as 69 engaged in an opening in upper contact portion 70 of trip 66, and curving rearwardly over stop 67. The bar is engaged at its rear end with a spring 71 stretched between it and a hook or the like 72 adjustable in a rearwardly extending portion 73 of plate 63 as by means of a thumb-nut 74.

In this position of the parts lower contact portion 75 is extended into the path of a tappet 76 fixed with wheel $W^1$, Fig. 1, the tappet, after a little more travel of the machine, contacting the portion 75 and raising it, and, through stop 67, plate 63 and bracket 60, as shown in Fig. 3, rocking square shaft 29 and moving push-rod 53 rearwardly. This movement, through crank portion 52, swings bail 43 forwardly and releases blade 38 as shown, allowing rotation of scraper wheel S. Tappet 76 almost immediately slips past the end of portion 75, allowing spring 55 to return push-rod 53, rotating bracket 60 back to its lower position, indicated in Figs. 1, 4 and 5, and returning bail 43 to the position indicated in dotted lines in Fig. 3, ready to intercept blade 39. Blade 38 will then occupy the position previously occupied by blade 37, and the body of soil 77, which has been propelled along ahead of blade 37 will be dropped during the interval between the release of blade 38 and the time it occupies the position previously occupied by blade 37. Blade 38 will promptly gather another body of soil to be released upon the next actuation of the trip. With this setting of the trip a dam will be formed for each revolution of wheel $W^1$.

When a longer space is desired between dams it is possible to cause actuation of the release mechanism for every other revolution of the wheel. For this purpose bar 69 is placed with a downwardly extending portion 78 engaged with contact portion 79 of trip 66, as shown in Figs. 4, 5 and 6. In this position the bar clears stop 67 and allows trip 66 to move up or down between stops 67 and 68, the bar and spring 71 exerting a pull on portion 70 tending to hold it yieldingly in either its upper or lower position, the direction of action changing as the extended center-line of spring 71 crosses pivot 62 during swinging movement of trip 66.

Bar 69 has notches 79, Fig. 3, and 80, Fig. 6, for engaging portion 70 and preventing inadvertent displacement of the bar.

With the parts in the position indicated in Fig. 6, the scraper is released when tappet 76 hits and actuates contacting portion 75 of trip 66, in a manner exactly similar to that shown in Fig. 3. When the tappet slips out from beneath the contacting portion 75, bracket 60 immediately returns to its lower position, as shown in Fig. 4, and comes to rest abruptly, stops 81, Figs. 1 and 2, on bail 43, contacting bars 35 to arrest movement of the bails and connected mechanism. Owing to the momentum imparted to trip 66 during this movement, the trip continues in motion, overcoming the resistance of spring 71 and carrying the parts "over center" into the position shown in Fig. 5. Upon its next pass, tappet 76 misses portion 75, and contacts portion 70, as suggested in Fig. 5, moving the trip into its upper position as shown in Fig. 6, but without affecting bracket 60, and, accordingly, without releasing the scraper. Upon its next pass the tappet will contact portion 75, and trip the release mechanism as above outlined in connection with Fig. 3, when the cycle will repeat itself.

Under different conditions and depths of plowing, drag-bars 34, 35, etc. may operate at different angles, resulting in different positions for square shaft 29. To obtain the correct positioning of stops 67 and 68 bolt 65 may be loosened (Fig. 3), and plate 63 shifted, slot 64 permitting this movement about the bolt, and the parts being clamped in the new position by again tightening the bolt.

Tappet 76 is preferably made removable, and other tappets may be provided if it is desired to provide a dam oftener than once in each revolution of the wheel $W^1$, two or more tappets being applied to the wheel for this purpose. Various combinations of tappets etc. may be arranged, for example, by placing three tappets on the wheel and setting the bar 69 in the relation to the trip shown in Figs. 4, 5 and 6, a dam will be formed at intervals of 1½ revolutions of the wheel. Other combinations will suggest themselves to the operator and are contemplated as within the scope of the invention.

Adjustments may be made to provide various spacings of the wheels, corresponding adjustments being possible on the scraper mechanism, and planting mechanism, or other accessories commonly used with lister plows or like implements may be applied without affecting the scraping device.

The blades 38, 39 etc. may have notches or cut-out portions 82, 83 etc., these operating to avoid scraping the bottom of the furrow at the center. This results in leaving a loose mulch in the center of the furrow over any seed which may be planted by apparatus mounted on the machine ahead of the scrapers.

A modification of the trip mechanism is shown in Figs. 7 and 8, particularly adapted to prevent damage to the mechanism in the event that the implement is backed, plate $63^a$ yielding to permit downward movement of trip 66 if tappet 76 contacts it from above, as would be the case upon reverse movement of the wheel $W^1$. Plate $63^a$, as seen in Fig. 7 has a clutch element 84 engaged with a mating clutch element 85, and maintained in engagement therewith by means of a spring 86 in compression between a bracket $60^a$ corresponding to above mentioned bracket 60, and a washer or abutment 87 maintained in position on a bolt 88, as by a nut 89. The teeth of clutch elements 84 and 85 are slanted as shown so that sufficient force in either direction will cause them to be forced apart, further compressing spring 86 and permitting rotation of plate $63^a$ about bolt 88.

Such rotation is prevented in one direction by a stop 90 clamped to plate $63^a$ as by a bolt 91, the stop normally resting on the upper surface of bracket $60^a$ as shown more particularly in Fig. 8. Stop 90 may be adjusted into various positions relative to plate $63^a$ in a manner analogous to that in which plate 63, above described, can be clamped directly to bracket 60 in the embodiments shown in Figs. 1 to 6 inclusive. The stop prevents rotation of plate $63^a$ relatively to bracket $60^a$ in a direction in which trip 66 would move upwardly, as seen in Fig. 7, which is the direction for actuating the mechanism for tripping the bails 43 and 51 and in which bracket $60^a$ can move, but said stop may move upwardly away from the bracket if trip 66 is forced downwardly by reverse motion of trip 76 by relative movement of clutch elements 84 and 85.

After such emergency movement of the parts the trip will usually re-set itself upon further forward movement of the implement, but in the event that it does not, plate $63^a$ can be returned easily by hand to its normal position against the resistance of the clutch and spring 86. In this way the mechanism is completely protected from damage from backing of the implement.

What is claimed and desired to be secured by Letters Patent of the United States is:

1. A basin forming implement including a wheeled frame, a plurality of furrow forming members carried by the frame, a plurality of rotatable drag members arranged to trail behind the furrow forming members and each including a plurality of substantially radially arranged blades mounted for rotation about an axis transverse to the direction of movement of the wheeled frame, spaced drag-bars connected between the wheeled frame and each of the drag members, and a movable bail connected between the drag-bars of each drag member and positioned to intercept the blades of each drag member and prevent rotation thereof.

2. A basin forming implement including a wheeled frame, a plurality of furrow forming members carried by the frame, means for raising and lowering the frame for placing the furrow forming members into and out of operation, a drag member arranged to trail behind each furrow forming member for scraping the furrows and forming a series of dams therein, an arm extended from the wheeled frame over each drag member, and connections from the arms to said drag members for raising the drag members when the frame is raised for interrupting the operation of said furrow forming members.

3. A basin forming implement including a wheeled frame, a plurality of furrow forming members carried by the frame, means for raising and lowering the frame for placing the furrow forming members into and out of operation, a rotatable drag member arranged to trail behind each furrow forming member and including a plurality of substantially radially arranged blades mounted for rotation about an axis transverse to the direction of movement of the wheeled frame, spaced drag-bars connected between the wheeled frame and each drag member, an arm extended from the wheeled frame over each drag member, and means arranged to connect the arms with the drag-bars for raising said bars and drag members when the frame is raised for interrupting the operation of said furrow forming members.

4. A basin forming implement including a wheeled frame, a furrow forming member carried by the frame, means for raising and lowering the frame for placing the furrow forming member into and out of operation, a rotatable drag member arranged to trail behind the furrow forming member and including a plurality of substantially radially arranged blades mounted for rotation about an axis transverse to the direction of movement of the wheeled frame, spaced drag bars pivotally connected to the wheeled frame, extending to the drag member and connected therewith, a movable bail connected between the drag bars and positioned to intercept said blades and prevent rotation thereof, an arm extended from the wheeled frame over the drag member, and a connection from the arm to said bail for raising said bars and said drag member when the frame is raised for interrupting the operation of said furrow forming member.

5. A basin forming implement including a wheeled frame, a furrow forming member carried by the frame, a drag arranged to trail behind the furrow forming member, holding means for maintaining said drag in position to scrape the furrow formed by said member, release mechanism for tripping the holding means to periodically place said drag out of scraping position to form a dam transversely of said furrow including a tappet on one of the wheels of said frame, a rock shaft, a bracket fixed with the rock shaft, a trip pivoted to the bracket and having spaced tappet contacting portions, stops limiting the pivotal movement of the trip relatively to the bracket, and means for yieldingly holding the trip in upper or lower positions, the parts being so disposed that the tappet may move the trip, through contact with one of said spaced contacting portions, from its lower to its upper position against one of said stops without affecting said bracket, and, on its second pass, may move said trip, through contact with the other contacting portion, to cause said trip, through contact with said stop, to move said bracket for actuating said rock shaft for placing said drag out of scraping position.

6. A basin forming implement including a wheeled frame, a furrow forming member carried by the frame, a drag-bar pivotally mounted on the frame, means for raising and lowering the frame for operating the furrow forming member at different depths, a drag connected to said drag-bar to trail behind the furrow forming member, holding means for maintaining said drag in position to scrape the furrow formed by said member, release mechanism for tripping the holding means to periodically place said drag out of scraping position to form a dam transversely of said furrow including a tappet on one of the wheels of said frame, a rock shaft, a bracket fixed with the rock shaft, a trip pivoted to the bracket and having spaced tappet contacting portions, stops limiting the pivotal movement of the trip relatively to the bracket, and means for yieldingly holding the trip in upper or lower positions, the parts being so disposed that the tappet may move the trip, through contact with one of said spaced contacting portions, from its lower to its upper position against one of said stops without affecting said bracket, and, on its second pass, may move said trip, through contact with the other contacting portion, to cause said trip, through contact with said stop, to move said bracket for actuating said rock shaft for placing said drag out of scraping position, said stops being adjustable relatively to said bracket to correctly position said trip for different angles of said drag bar caused by different adjustments of the height of said frame.

7. In a basin forming implement a wheeled plow frame, a plurality of plow bottoms connected to the frame, rotatable scraping devices connected to the frame and arranged to trail behind the respective plow bottoms, and means for releasing said scraping devices for rotation for depositing small bodies of soil as dams across the furrows, including a shaft supported on the frame and extending transversely of the direction of travel thereof, individual retaining means for each scraping device, a connection from the shaft to each of said retaining means, and trip mechanism at one end of the shaft adjacent to one of the wheels of said frame arranged to be contacted to move the shaft periodically according to the revolutions of the wheel for actuating said individual retaining means for releasing said scraping devices.

8. In a basin forming implement including a wheeled frame and dam forming mechanism a rock shaft connected for actuating the dam forming mechanism, and mechanism for moving the rock shaft including a bracket connected to said rock shaft, a trip pivoted to the bracket and having spaced tappet contacting portions, stops arranged for limiting the pivotal movement of the trip relatively to the bracket, and means arranged to yieldingly hold the trip in upper or lower positions, and a tappet actuated by one of the wheels of said frame and arranged to contact said trip upon rotation of said wheel.

9. In a basin forming implement including a wheeled frame and dam forming mechanism a rock shaft connected for actuating the dam forming mechanism, and mechanism for moving the rock shaft including a bracket connected to the rock shaft, a trip pivoted to the bracket and having spaced tappet contacting portions, stops arranged for limiting the pivotal movement of the trip relatively to the bracket, said mechanism including means for yieldingly holding the trip in upper or lower positions against said stops and means for maintaining said trip in position against one of said stops, and a tappet actuated by one of the wheels of said frame and arranged to contact said trip upon rotation of said wheel.

10. The combination, with an implement of the the class described including a wheeled frame carrying a furrow forming tool, of drag-bars pivotally mounted on the frame, a dam-forming tool mounted on the drag-bars, means on the drag-bars for engaging the latter tool in non-rotating condition, a push-rod pivotally connected to the frame and also to the engaging means, and tripping mechanism associated with the push-rod and operable by the implement wheel to actuate the push-rod for releasing said engaging means whereby the dam-forming tool may rotate to scraping position to form a dam across a furrow.

11. The combination, with an implement of the class described including a wheeled frame carrying a furrow-forming tool, of a rock-shaft mounted on said frame, drag-bars connected to said rock-shaft, a rotatable dam-forming tool mounted on the drag-bars, means on the drag-bars for engaging the latter tool in non-rotating condition, means for releasing the engaging means whereby said tool may rotate, and tripping mechanism associated with the rock-shaft and in proximity to the implement wheel adapted to be operated by the latter to actuate the rock-shaft and periodically adjust said dam-forming tool into scraping position to form a dam transversely of a furrow.

12. In a basin forming implement including a wheeled frame, a furrow forming member carried by the frame, a drag arranged to trail behind said member and scrape the furrow formed thereby, a rock-shaft connected for releasing the drag for placing it out of scraping position to form a dam across said furrow, mechanism for moving the rock-shaft including a bracket on the rock-shaft, a trip pivoted to the bracket, and having spaced tappet contacting portions, stops limiting the pivotal movement of the trip relatively to the bracket, and means for yieldingly holding the trip in upper or lower positions, said means including a bar having long and short relatively transverse legs, a spring connected with the long leg and anchored in tension at a point on the side of the trip pivot opposite said trip, said long leg passing above the upper stop and said short leg being pivotally engageable with said trip alternatively at a point adjacent said long leg; whereby said trip and said long leg engage the sides of said upper stop and substantially prevent movement of said trip, or at a point remote from said long leg; whereby said trip is free to pivot between the limits determined by said stops; and a tappet actuated by one of the wheels of said frame and arranged to contact said trip upon rotation of said wheel.

13. A basin forming implement including a wheeled frame, a furrow forming member carried by the frame, a rotatable drag arranged to trail behind the furrow forming member, holding means for preventing rotation of the drag, release mechanism for tripping the holding means to allow rotation of the drag for forming a dam across the furrow including a tappet on one of the wheels of said frame, a rock shaft, a bracket fixed with the rock shaft, a trip pivoted to the bracket and having spaced tappet contacting portions, stops limiting the pivotal movement of the trip relatively to the bracket, and means for yieldingly holding the trip in upper or lower positions, the parts being so disposed that the tappet may move the trip, through contact with one of said spaced contacting portions, from its lower to its upper position against one of said stops without affecting said bracket, and, on its second pass, may move said trip, through contact with the other contacting portion, to cause said trip, through contact with said stop, to move said bracket for actuating said rock shaft and releasing said drag for rotation.

CARL E. WHITE.